United States Patent
Taylor et al.

(10) Patent No.: US 6,202,783 B1
(45) Date of Patent: Mar. 20, 2001

(54) HYDROSTATICALLY DRIVEN VEHICLE WITH RETARDER VALVE

(75) Inventors: Lloyd Taylor, Aukrug; Wilhelm Göllner, Neumünster, both of (DE)

(73) Assignee: Sauer Inc., Ames, IA (US)

( * ) Notice: Subject to any disclaimer, the term of this patent is extended or adjusted under 35 U.S.C. 154(b) by 0 days.

(21) Appl. No.: 09/438,561

(22) Filed: Nov. 10, 1999

(30) Foreign Application Priority Data

Nov. 11, 1998 (DE) .............................................. 198 52 039

(51) Int. Cl.[7] .................................................. B60K 17/00
(52) U.S. Cl. ........................................... 180/305; 180/53.4
(58) Field of Search .................................. 180/305, 306, 180/307, 53.4

(56) References Cited

U.S. PATENT DOCUMENTS

| | | | |
|---|---|---|---|
| 3,805,640 | * | 4/1974 | Schneider et al. ...................... 74/645 |
| 3,931,870 | * | 1/1976 | Memmer ................................ 188/296 |
| 3,952,511 | * | 4/1976 | Turner et al. ........................... 60/430 |
| 4,077,484 | * | 3/1978 | Dezelan ............................... 180/44 M |
| 4,102,425 | * | 7/1978 | Marsden et al. ..................... 180/66 F |
| 4,241,577 | * | 12/1980 | Baldauf ................................... 60/420 |
| 4,254,845 | * | 3/1981 | Braun .................................... 180/306 |
| 4,324,387 | * | 4/1982 | Steinhagen ........................... 254/310 |
| 4,359,130 | * | 11/1982 | Kirkham ............................... 180/306 |
| 4,651,846 | * | 3/1987 | Headrick ............................... 180/243 |
| 4,696,367 | * | 9/1987 | Delfs ..................................... 180/306 |
| 5,052,511 | * | 10/1991 | Hunt ...................................... 180/305 |
| 5,117,936 | * | 6/1992 | Nakamura et al. ................... 180/242 |
| 5,390,769 | * | 2/1995 | Gollner ................................. 180/307 |
| 5,709,282 | * | 1/1998 | Akira et al. ........................... 180/307 |
| 5,919,243 | * | 7/1999 | Huh ........................................ 701/50 |

FOREIGN PATENT DOCUMENTS

0317290 * 5/1989 (EP) ..................................... 180/305

* cited by examiner

*Primary Examiner*—Brian L. Johnson
*Assistant Examiner*—Gerald Klebe
(74) *Attorney, Agent, or Firm*—Zarley, McKee, Thomte, Voorhees & Sease

(57) ABSTRACT

A vehicle having a hydrostatic drive and a hydraulic control apparatus, in which the hydrostatic drive has a variable displacement hydraulic pump and a hydraulic motor in a closed circuit, an internal combustion engine for driving the hydraulic pump and a variable displacement pump, producing a volumetric output flow, of an open circuit, and a retarder valve arranged in the open circuit and intended for the hydraulic absorption of braking energy. The retarder valve has a valve and a pressure-limiting valve, connected thereto, for throttling the volumetric output flow of the variable displacement pump. The variable displacement hydraulic pump, the variable displacement pump and the retarder valve are controlled by a digital electronic unit for the respective driving and working functions.

11 Claims, 2 Drawing Sheets

HYDROSTATICALLY DRIVEN VEHICLE WITH RETARDER VALVE

BACKGROUND OF THE INVENTION

Vehicles which have a hydrostatic drive are generally exposed to extreme fluctuations with regard to the load to be handled and with regard to the vehicle speed to be realized. Frequent and rapid braking of the vehicle is therefore necessary. In particular, the wear of the conventional brakes is therefore relatively high. In the case of vehicles having hydrostatic drives, the vehicle is often braked by an infinitely variable change in the transmission ratio. However, the rotational speed of the internal combustion engine providing the requisite drive power is increased in order to absorb the kinetic energy of the vehicle during the braking operation. This increase in the rotational speed is detrimental to the service life of the internal combustion engine and in addition leads to generally unacceptable high noise emissions.

Hydrostatically driven fork stackers are typically driven only by means of a travel-direction switch and an accelerator pedal, which controls the internal combustion engine and the respective transmission ratio. This enables the driver to operate the vehicle in a simple manner with regard to the driving and therefore enables the driver to fully concentrate on the operations to be carried out by the vehicle. Fork stackers usually have no conventional service brake and utilize the hydrostatic traction drive as a brake. Thus, all the kinetic energy of the vehicle, during braking or deceleration of the latter, is directed via the hydrostatic transmission to the internal combustion engine, which typically is a diesel engine. Since the internal combustion engine only has limited power absorption, a large proportion of the vehicle energy is transmitted into the flywheel, so that the rotational speed increases considerably. The problem described occurs in relation to the vehicle speed, its mass and the requisite braking deceleration. It has therefore become known to provide a retarder device, by means of which additional energy can be converted into heat.

In wheeled loaders and off-highway stackers, because of considerably higher travel speeds to be achieved, conventional service brakes are also provided. In addition to the conventional service brakes, a retarder device, which works in parallel with the service brake, is provided in these vehicles. The retarder device serves in principle to reduce the brake wear and enables the vehicle to travel a longer distance on a gradient without reaching the critical temperature of the service brake.

A feature common to the existing systems during the function of the retarder is a purely mechanical drive branch, so that the kinetic energy of the vehicle can pass to the variable displacement pump.

Therefore, the principal object of this invention is to provide a vehicle having a permanent hydrostatic traction drive or a hydraulic control apparatus wherein a retarder valve device provided instead of or in addition to a brake device, works essentially free of wear; the internal combustion engine is not overloaded; and the number of components for this arrangement is reduced.

These and other objects will be apparent to those skilled in the art.

SUMMARY OF THE INVENTION

According to a first aspect of the invention, the vehicle has a hydrostatic drive with a variable displacement hydraulic pump and a hydraulic motor. The motor has a fixed displacement motor or a variable displacement motor in a closed circuit. An internal combustion engine drives the hydraulic pump and a variable displacement pump, producing a volumetric output flow, of an open circuit. A retarder valve device is in the open circuit and provides for the hydraulic absorption of braking energy. The retarder valve device has a valve and a pressure-limiting valve hydraulically connected to the valve. The pressure-limiting valve serves to throttle the volumetric output flow of the variable displacement pump, throttling preferably being effected into a tank.

By the throttling action of the pressurelimiting valve, at least some of the kinetic energy of the vehicle is converted into heat during the braking phase of the vehicle. This avoids high rotational speeds of the internal combustion engine. As a result, the service life of the internal combustion engine is considerably increased. The valve is preferably designed as a proportional valve in an open circuit. Both the proportional valve and the pressure-limiting valve are in the open circuit. This results in a simple construction which comprises few components and ensures essentially wear-free operation of the retarder valve device.

In an alternative embodiment of the invention, a priority valve is provided in the open circuit, whereupon the volumetric output flow of the variable displacement pump can be delivered either to the steering or to the hydraulic working system. In this case, priority is given to the steering.

The hydraulic working system preferably has a plurality of functional units such as lifting, tipping, etc. The respective hydraulic working system is connected via shuttle valves of the open circuit preferably to a load-sensing control device of the variable displacement pump. It is thereby possible for the respectively maximum working pressure required to be provided by the variable displacement pump.

In a second alternative embodiment, the valve can be activated electrically or in an electrically proportional manner in order to be able to realize the above mentioned functions according to the invention.

In a third alternative embodiment, a position sensor for detecting the position of a brake pedal is provided. In that case, the retarder valve can be activated as a function of the position of the brake pedal detected by the position sensor. This means that the retarder valve can be used in parallel with the action of a conventional brake or can be activated via a conventional brake pedal.

The retarder valve device is preferably designed or activated in such a way that the retarder valve device is in an inactive position, and is typically closed, when the vehicle comes to a standstill. This ensures that no hydraulic braking power is then produced.

According to a fourth alternative of the invention, a hydraulic control apparatus is provided for a vehicle having a hydrostatic drive, which has a variable displacement hydraulic pump and a hydraulic motor in a closed circuit; an internal combustion engine for driving the hydraulic pump and a variable displacement pump of an open circuit; and a retarder valve device arranged in the open circuit. The control apparatus is provided with a digital electronic unit for controlling desired driving functions, in particular via the hydraulic pump, the variable displacement pump and the retarder valve device. Fully electronic control of the respective driving and working functions, i.e. driving at maximum or restricted speed, braking operation, acceleration operation, execution of certain working functions, etc., is possible by means of the digital electronic unit.

In a development of the invention, the retarder valve device has a valve and a pressure-limiting valve, connected thereto, for throttling the volumetric output flow of the variable displacement pump. It is thereby possible, with the hydraulic control apparatus according to the invention, to reduce kinetic energy of the vehicle during the braking phase, convert it into heat and dissipate it via the hydraulic circuit, so that high rotational speeds of the internal combustion engine can be reduced or can be avoided during the braking.

The retarder valve device can be controlled by means of a position sensor as a function of the position of a brake pedal. If a desired speed of the vehicle is exceeded, the retarder valve can preferably be activated in such a way that, as the desired speed is increasingly exceeded, the braking action of the retarder valve increases. This ensures that, the higher the vehicle speed is above the desired speed, the greater the volumetric outlet flow of the variable displacement pump in the retarder valve becomes, specifically throttled in the pressure-limiting valve, as a result of which kinetic or potential energy of the vehicle is reduced hydraulically and converted into heat.

In another aspect of the invention, if the admissible rotational speed of the internal combustion engine is exceeded, a signal can be produced by means of a rotational-speed sensor, on the basis of which the retarder valve device can be controlled. This ensures that the internal combustion engine is protected with technically simple means and its service life is thus increased.

BRIEF DESCRIPTION OF THE DRAWINGS

FIG. 1 schematically shows a hydraulic control apparatus for a vehicle, specifically for wheeled loaders and off-highway stackers. An internal combustion engine 1 drives a variable displacement pump 2 for an open circuit and a hydraulic pump 3 in the form of a variable displacement pump for the closed circuit or for the actual traction drive. The volumetric output flow of the hydraulic pump 3 acts on a variable displacement motor 4, likewise arranged in the closed circuit, and drives the wheels of the vehicle via respective transfer cases. The volumetric output flow of the variable displacement pump 2 passes via a priority valve 5 with first priority to a steering gear 6 and with second priority to a respective hydraulic working system 7, 8. The hydraulic working system 7, 8 consists of individual consumers, such as, for example, a valve 7 for lifting, a valve 8 for tipping, etc.

Figure 1:
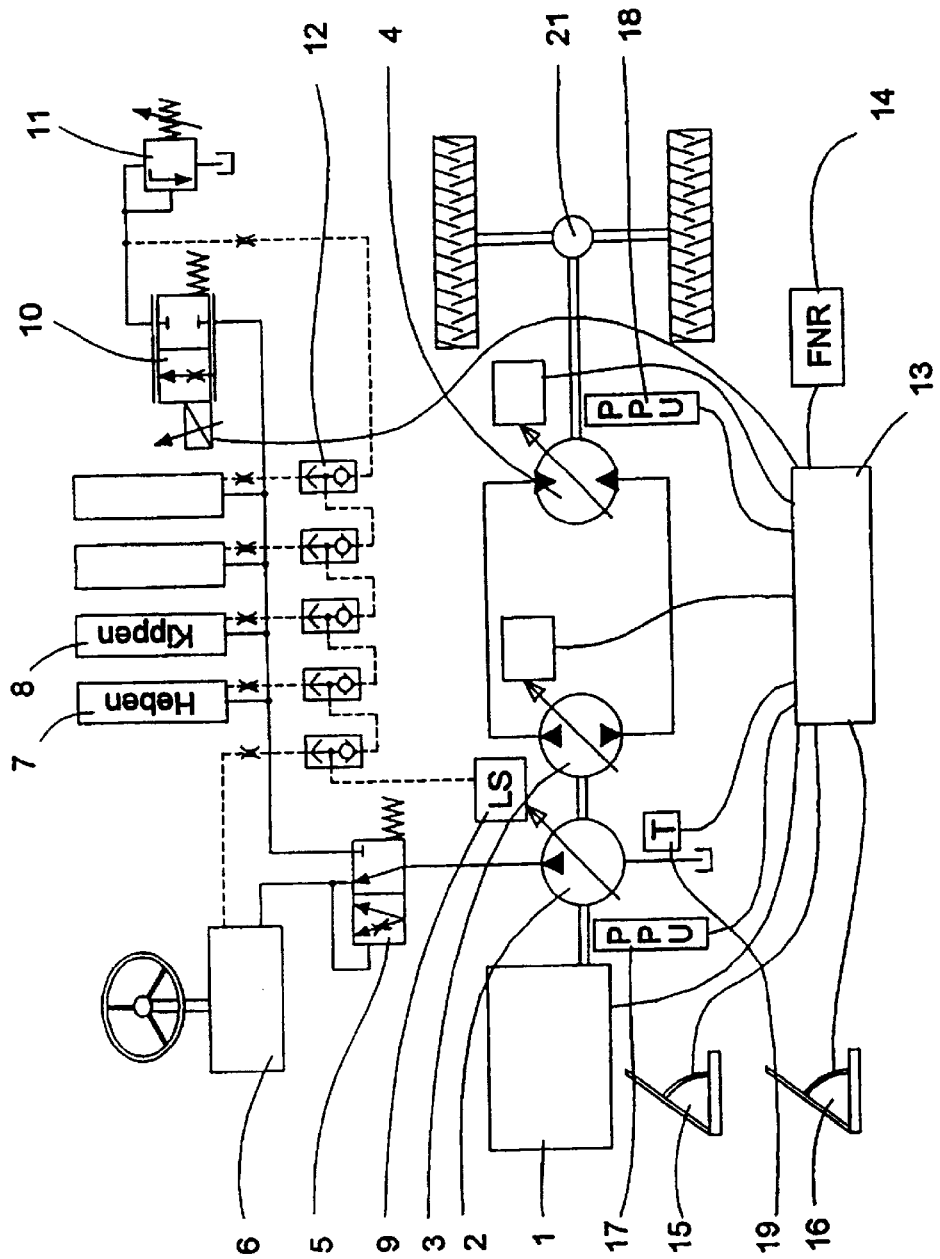
FIG. 1 schematically shows the construction of a hydraulic control apparatus for a vehicle with hydrostatic drive for wheeled loaders and off highway stackers, and FIG. 2 schematically shows the construction of a hydrostatic control apparatus in a further exemplary embodiment of the invention for a fork stacker.

A further electrically proportional valve 10 permits an infinitely variable volumetric flow to a pressure-limiting valve 11 hydraulically connected to the electrically proportional valve 10. The electrically proportional valve 10 and the pressurelimiting valve 11 constitute the actual retarder valve device. The pressurized volumetric flow is throttled at the pressure-limiting valve 11 to a tank (not specifically shown). The hydraulic output is converted into heat by this throttling.

Pressure balances may be connected at all the valves 7, 8 to the respective consumers, so that the volumetric flow through the individual valves 7, 8 is independent of the prevailing pressure. Precise metering of the volumetric flow is thus possible, which is normal in particular in the case of so-called load sensing systems. The individual consumers (valves 7, 8) of the open circuit are connected via shuttle valves 12 to a load-sensing control 9 of the variable displacement pump 2, so that the respectively highest working pressure required is always provided by the variable displacement pump. A digital electronic unit 13 serves to provide the entire control of the vehicle. In this case, a desired speed value is generated from the signal of an accelerator pedal 15, and the rotational speed of the internal combustion engine 1, the swing angle of the variable displacement pump 3 and the swing back of the variable displacement motor 4 are derived accordingly. The delivery direction of the hydraulic pump 3 is preset as a function of a travel direction switch 14, a distinction being made between forward travel and reverse travel.

Depending on the position of a brake pedal 16, the valve 10 of the retarder valve device is activated in such a way that, during light braking, first of all the retarder valve device performs a braking action and not until after that does the conventional service brake perform its action. With decreasing rotational speed of the internal combustion engine 1, the action of the retarder valve device is withdrawn in order to protect the internal combustion engine from so-called stalling. When the vehicle has come to a standstill, the retarder valve device is likewise cut off in order to eliminate unnecessary power losses.

Since the vehicle speed depends on the position of the accelerator pedal 15, the retarder valve device, as an alternative to actuating the latter via the brake pedal, may also be brought into operation via a deviation of the speed from a set point input at the accelerator pedal 15. In such a circuit arrangement, the retarder valve device is activated with increasing withdrawal of the accelerator pedal 15. This has the advantage that, at most operating points, an actuation. Of the conventional service brake is not necessary.

In the event of prolonged use of the retarder valve device and an inadequate cooling capacity at, for example, high outside temperatures, exceeding of the maximum temperature of the hydraulic medium can be sensed by means of a temperature sensor 19. The driver is therefore informed of the respective state of the components in the hydraulic circuit via signals in the form of, for example, lamps on the instrument panel. The driver can withdraw the action of the retarder valve device manually upon reaching limit states, which may be established via corresponding displays on the instrument panel. However, it is also possible to automatically withdraw the action of the retarder valve device in order to prevent damage to the hydrostatic transmission.

Figure 2:
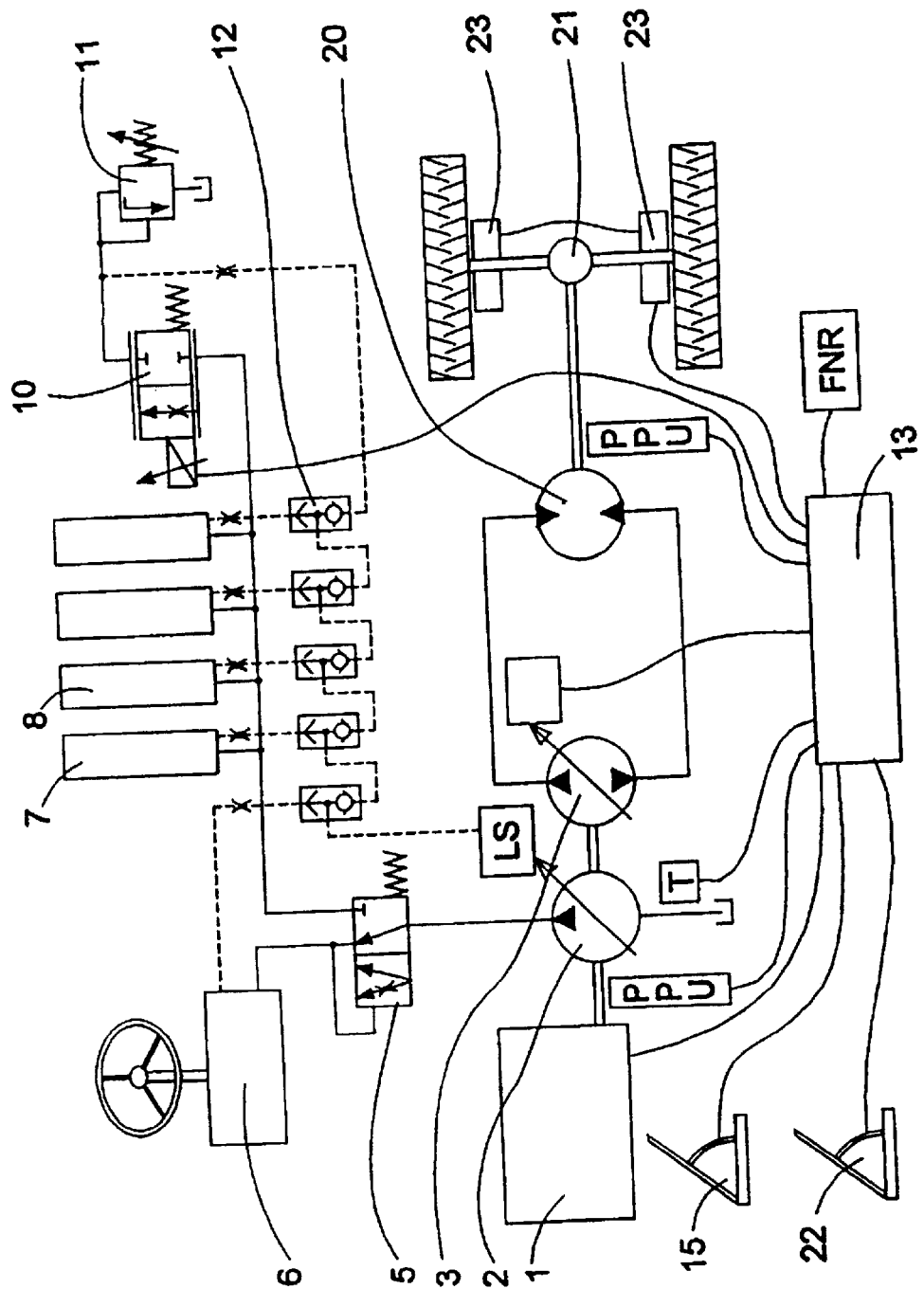

A hydraulic control apparatus with a retarder valve device for a fork stacker is shown in FIG. 2. With regard to the basic hydraulic arrangement, the control apparatus shown, with retarder valve device, is identical to that according to FIG. 1. The differences, however, consist, on the one hand, in the hydrostatic traction drive, in which, in the embodiment described in FIG. 2, it is not a variable displacement motor but a fixed displacement motor 20 which is provided for driving a vehicle axle 21. Furthermore, a brake pedal is not provided there, since fork stackers typically have a lower maximum travel speed, as a result of which it is possible for the internal combustion engine 1 to effect the requisite braking on its own. In order to park the vehicle, an additional lever 22 for actuating the parking brakes 23 is provided. The basic function of the hydraulic control of the retarder valve device is analogous to that described in connection with FIG. 1.

We claim:

1. A vehicle having a hydrostatic drive, which has a variable displacement hydraulic pump (3) and a hydraulic motor (4) in a closed circuit, an internal combustion engine (1) for driving the hydraulic pump (3), and a second variable displacement pump (2), producing a volumetric output flow, of an open circuit, comprising, a retarder valve device arranged in the open circuit for the hydraulic absorption of braking energy, the retarder valve device having a proportional electrically activated valve (10) connected to a pressure-limiting valve (11) for throttling the volumetric output flow of the second variable displacement pump (2).

2. The vehicle of claim 1, wherein a priority valve (5) is provided in the open circuit, whereby the volumetric output flow of the second variable displacement pump can be delivered to a hydraulic working system.

3. The vehicle of claim 2, wherein the hydraulic working system is connected via shuttle valves (12) of the open circuit to a load sensing control device (9) of the second variable displacement pump (2).

4. The vehicle as claimed in claim 1, wherein a position sensor for detecting the position of a brake pedal (16) is provided, so that the retarder valve device (10, 11) can be activated as a function of the detected position of the position sensor.

5. The vehicle as claimed in claim 1, wherein the retarder valve device is in an inactive position when the vehicle comes to a standstill.

6. The vehicle as claimed in claim 1, wherein the volumetric output flow can be throttled into a tank.

7. A hydraulic control apparatus for a vehicle having a hydrostatic drive, which has a variable displacement hydraulic pump (3) and a hydraulic motor (4) in a closed circuit, and an internal combustion engine (1) for driving the hydraulic pump (3) and a second variable displacement pump (2) of an open circuit, comprising, a retarder valve device arranged in the open circuit and having a proportional electronically activated valve (10) connected to a pressure-limiting valve (11), a digital electronic unit (13) for controlling desired driving and working functions of the vehicle being electrically connected to the proportional electronically activated valve (10).

8. The hydraulic control apparatus of claim 7, wherein the retarder valve device has a valve (10) and a pressure-limiting valve (11) connected thereto, for throttling the volumetric output flow of the second variable displacement pump (2).

9. The hydraulic control apparatus claim 7 in which the retarder valve device can be controlled by means of a position sensor as a function of the position of a brake pedal (16).

10. The hydraulic control apparatus as claimed in claim 7 wherein the retarder valve device can be activated so that as a desired speed of the vehicle is increasingly exceeded, the braking action of the retarder valve increases.

11. The hydraulic control apparatus as claimed in claim 7, in which, if the admissible rotational speed of the internal combustion engine (1) is exceeded, a signal can be produced by means of a rotational-speed sensor (17), so that the retarder valve device can be controlled.

* * * * *